United States Patent [19]
Lancaster et al.

[11] 3,768,364
[45] Oct. 30, 1973

[54] MACHINE TOOL HAVING TWO ADJUSTABLE CUTTER HEADS

[75] Inventors: James Kenneth Lancaster; David William Yates, both of Coventry, Warwickshire, (Binley), England

[73] Assignee: Caludon Engineering Company Limited, Binley, Coventry, England

[22] Filed: Nov. 24, 1971

[21] Appl. No.: 201,768

Related U.S. Application Data
[62] Division of Ser. No. 42,085, June 1, 1970.

[52] U.S. Cl. ..................... 90/15, 90/15.1 R, 90/16, 408/234
[51] Int. Cl. ........................... B23c 1/14, B23c 1/12
[58] Field of Search ...................... 90/15, 15.1, 14, 90/16, 11 R; 408/234

[56] References Cited
UNITED STATES PATENTS

| | | | |
|---|---|---|---|
| 2,393,696 | 1/1946 | Kraut et al. | 90/16 |
| 3,283,664 | 11/1966 | Cross et al. | 90/14 |
| 3,458,881 | 8/1969 | Drechsler et al. | 90/14 X |
| 3,459,069 | 8/1969 | Grover | 90/14 X |

*Primary Examiner*—Gil Weidenfeld
*Attorney*—Mawhinney & Mawhinney

[57] ABSTRACT

A machine tool, primarily for producing slots in a workpiece, has a rotatable work-table for supporting the workpiece, a cutter head on which a rotatable cutting tool is carried and a support frame for the cutter head. The cutter head is movable relative to the support frame and work-table drive means rotates the work-table in a series of accurately predetermined increments or continuously. The increments of movement of the work-table are variable in magnitude and the cutting tool makes a cut in the work-table between each incremental movement. Two cutter heads are normally provided both of which are carried on a common support frame.

6 Claims, 20 Drawing Figures

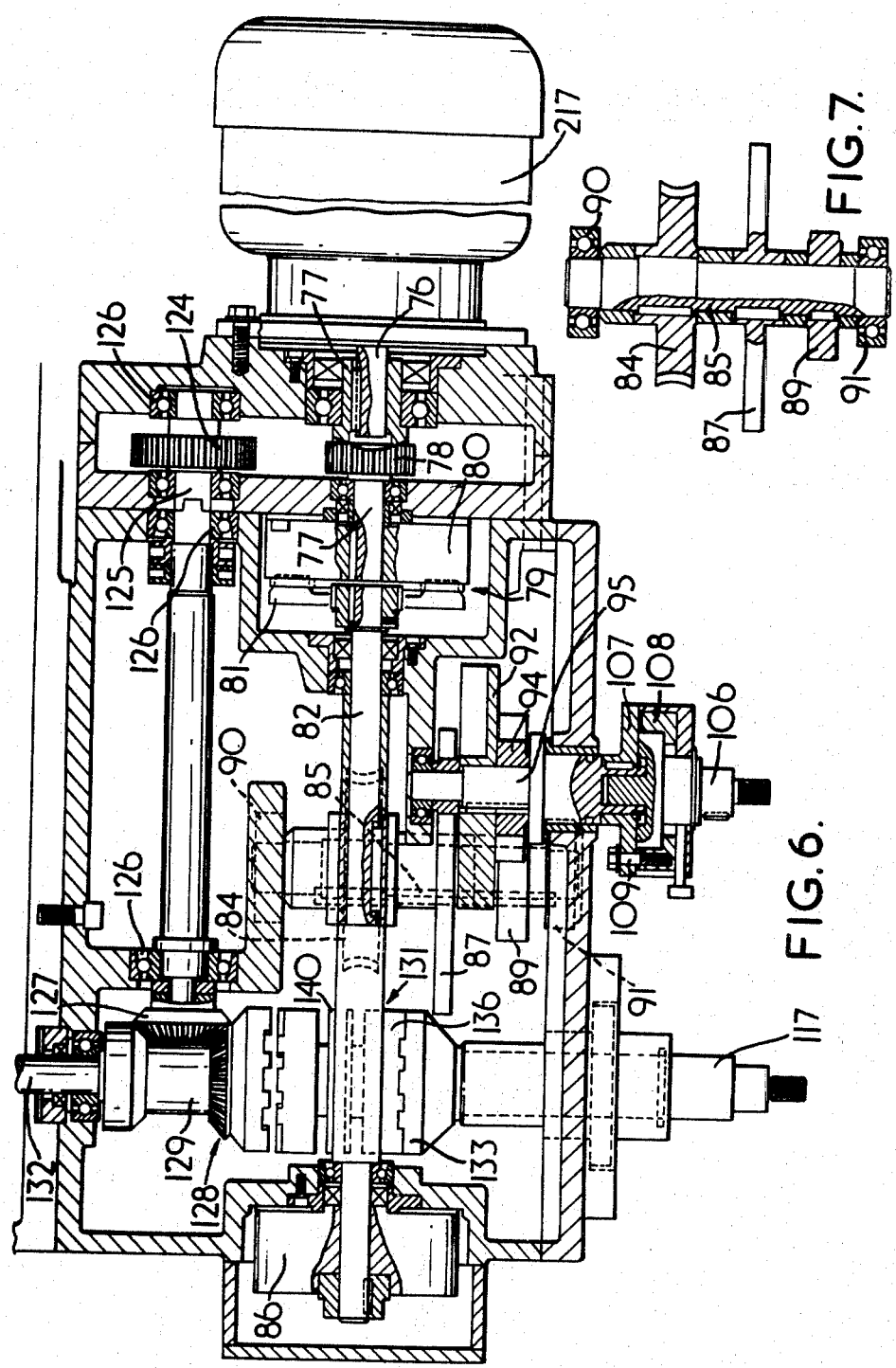

MACHINE TOOL HAVING TWO ADJUSTABLE CUTTER HEADS

This is a division of application Ser. No. 42,085, filed June 1, 1970.

This invention relates to machine tools and particularly, but not exclusively, to tools which are arranged to cut grooves, slots or the like at predetermined spacings in the surface of a workpiece.

Machine tools are required which have a work table on which the workpiece is mounted and in which the table is rotatable in predetermined increments, and in which after each increment of rotation a cutter cuts a slot in the workpiece. In many applications it is important that the slots be very accurately spaced around the workpiece and that the spacing of the slots be formed at variable spacings. The means for rotating the table should be sufficiently accurate to always rotate the table in equal increments, especially when the increments are small, and an unacceptable cumulative error in the spacings may occur which renders the finished workpiece unacceptable. The desirability of providing means whereby the table may be rotated continuously to centre the workpiece, and the desirability of providing means for interrupting the cutting sequence, for example in the event of a broken cutter tool, make for further complications in providing suitable means for rotating the work table.

Furthermore some workpieces may require two sets of slots formed in them at predetermined interrelated positions, and hitherto each set of slots has had to be produced in a separate cutting operation. In order to save time it is desirable that one cutting machine should be capable of cutting both sets of slots simultaneously.

An object of the invention is to provide a machine tool which meets at least some of the above characteristics and which incorporates an indexing mechanism capable of accurately indexing the workpiece after each machining operation.

According to one aspect of the invention a machine tool comprises a rotatable work table for supporting a workpiece, a cutter head on which a rotatable cutting tool for acting on the workpiece is arranged to be carried, a support frame for the cutter head, drive means for rotating the cutting tool, drive means for moving the cutter head relative to the associated cutter head support frame, and drive means for driving the work table in a series of accurately predetermined incremental movements and for continuously rotating the work table, the increments of movement of the work table being variable in magnitude.

Preferably the drive means for the cutter head is arranged to move the cutter head radially of or parallel to the axis of rotation of the work table.

The machine may comprise two cutter heads each having drive means for moving the cutter heads relative to their associated support frame, one cutter head being movable radially of the work table and the other being movable parallel to the axis of rotation of the work table.

The cutter heads may be mounted on a common support frame.

According to a further feature of the invention the machine tool comprises two or more cutting heads mounted on a common support frame for movement with respect to the support frame.

Each of the cutter heads may have a guide cooperating with a guideway on the support frame, and the drive means, which is arranged to move each guide along the associated guideway, may include a rotatable screw-threaded shaft which is in screw-threaded engagement with the cutter head.

The drive means for moving the or each cutter head relative to the associated support frame may be operable at at least two speeds, one speed being for movement of the cutter head during a cutting operation of the cutting tool and the other, relatively faster speed being for returning the cutting head to its initial position with respect to the support frame.

According to a further feature of the invention the support frame includes a cutter body upon which the cutter head is supported, the cutter head being movable by said drive means relative to the cutter body and the cutter body being movable relative to the support frame in a direction at a right angle with respect to said movement of the cutter head relative to the cutter body.

The drive means for moving the or each cutter head relative to the cutter body may be carried on the cutter body.

Conveniently the drive means for the cutting tool includes change speed means for varying the rotational speed of the cutting tool and the drive means for the cutting tool is carried on the cutter head.

According to a still further feature of the invention the drive means for the work table includes a drive motor, a geneva mechanism, and a worm and worm wheel, the geneva mechanism being selectively engageable with the drive motor and the worm and worm wheel to obtain variable increments of movement of the work table.

The work table drive means may include clutch means whereby the work table is drivable in increments through the geneva mechanism or is drivable continuously by-passing the geneva mechanism.

Conveniently the drive to the work table from the drive motor is disconnectable and the work table is rotatable manually independently of the drive motor and geneva mechanism.

According to a further aspect of the invention a machine tool comprises a work table for supporting a workpiece, two cutting heads on each of which a rotatable cutting tool for acting on the workpiece is arranged to be carried, a support frame common to both cutter heads on which the cutter heads are supported, drive means carried on each cutter head for rotating the associated cutting tool, and drive means for moving the cutter heads relative to the support frame.

Preferably the machine tool comprises drive means for rotating the work table in a series of accurately predetermined incremental movements and for continuously rotating the work table, the increments of movement of the work table being variable in magnitude.

Further features of the invention appear from the following description of an embodiment of the invention given by way of example only and with reference to the drawings, in which:

FIG. 6 is a sectional plan view of the work table drive means,

FIG. 7 is a sectional view through the worm shaft of FIG. 6,

Figure 1:
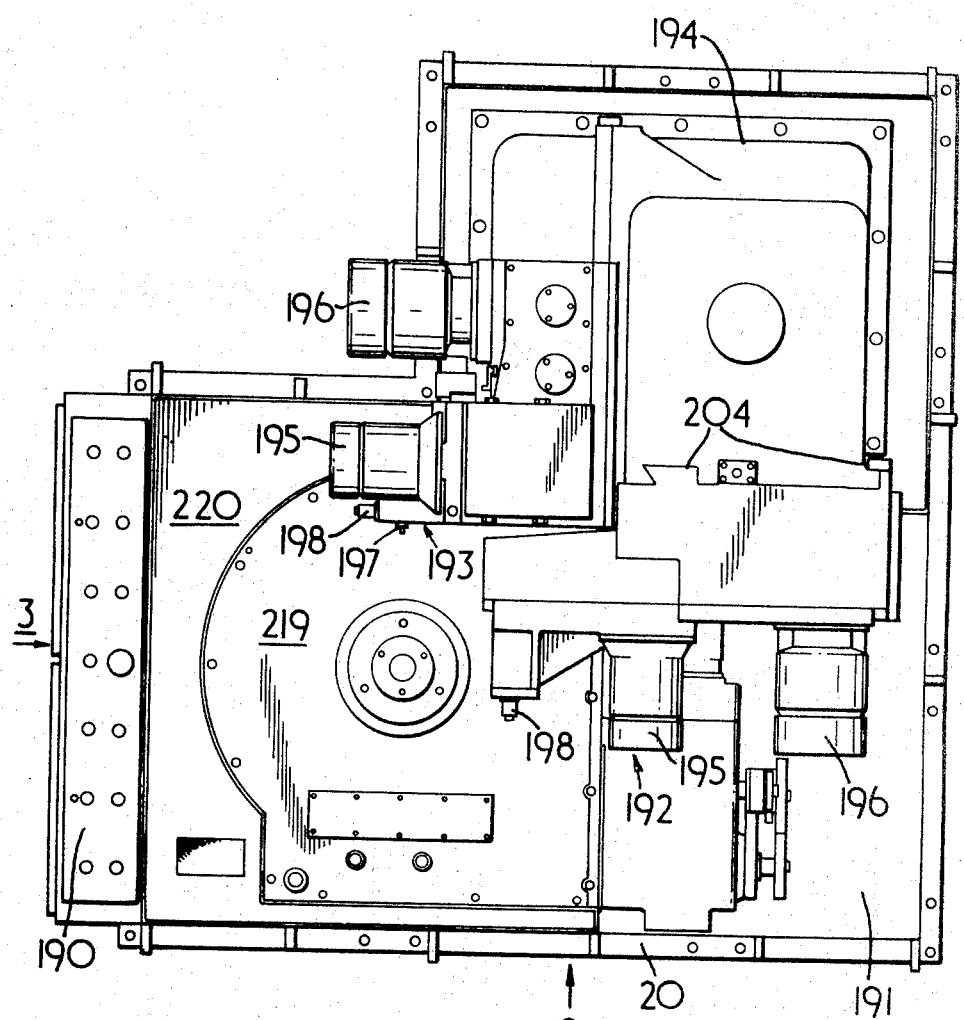
FIG. 1 is a plan view of a complete machine.
Figure 2:
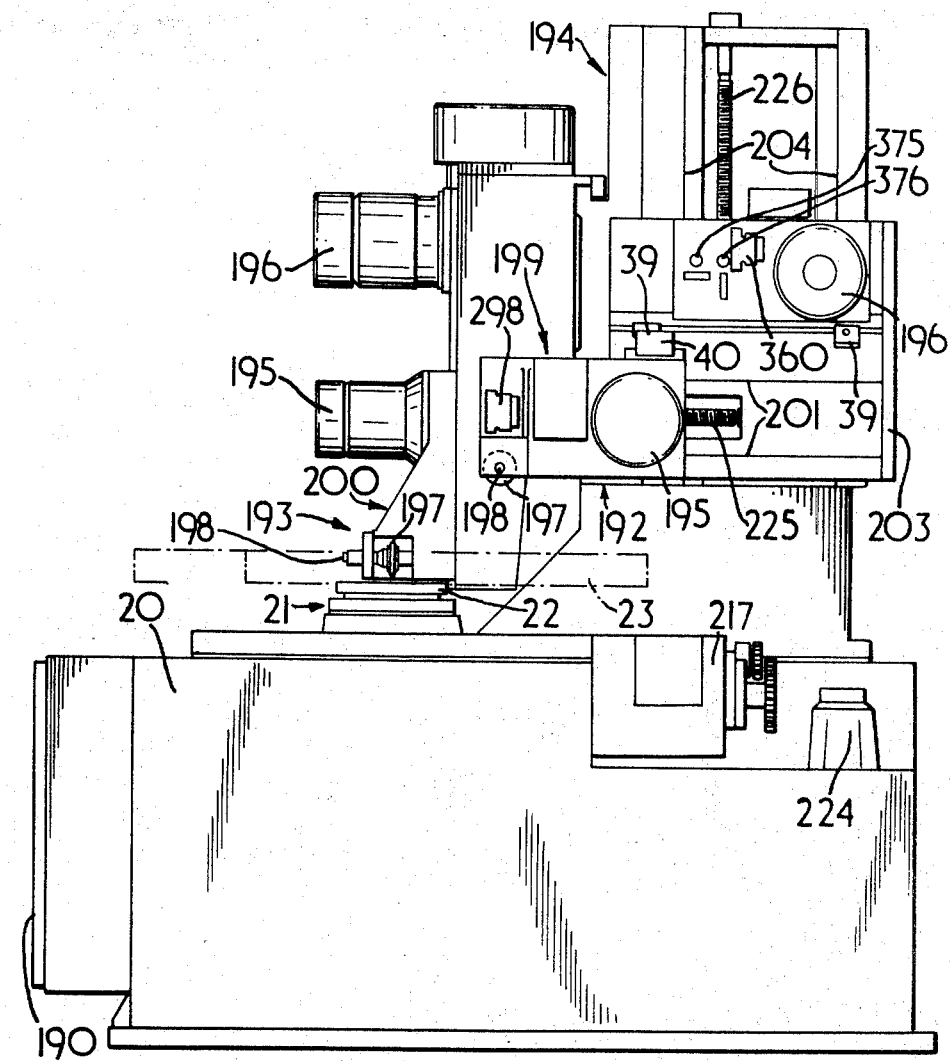
FIG. 2 is a side elevation in the direction of arrow 2 in FIG. 1.
Figure 3:
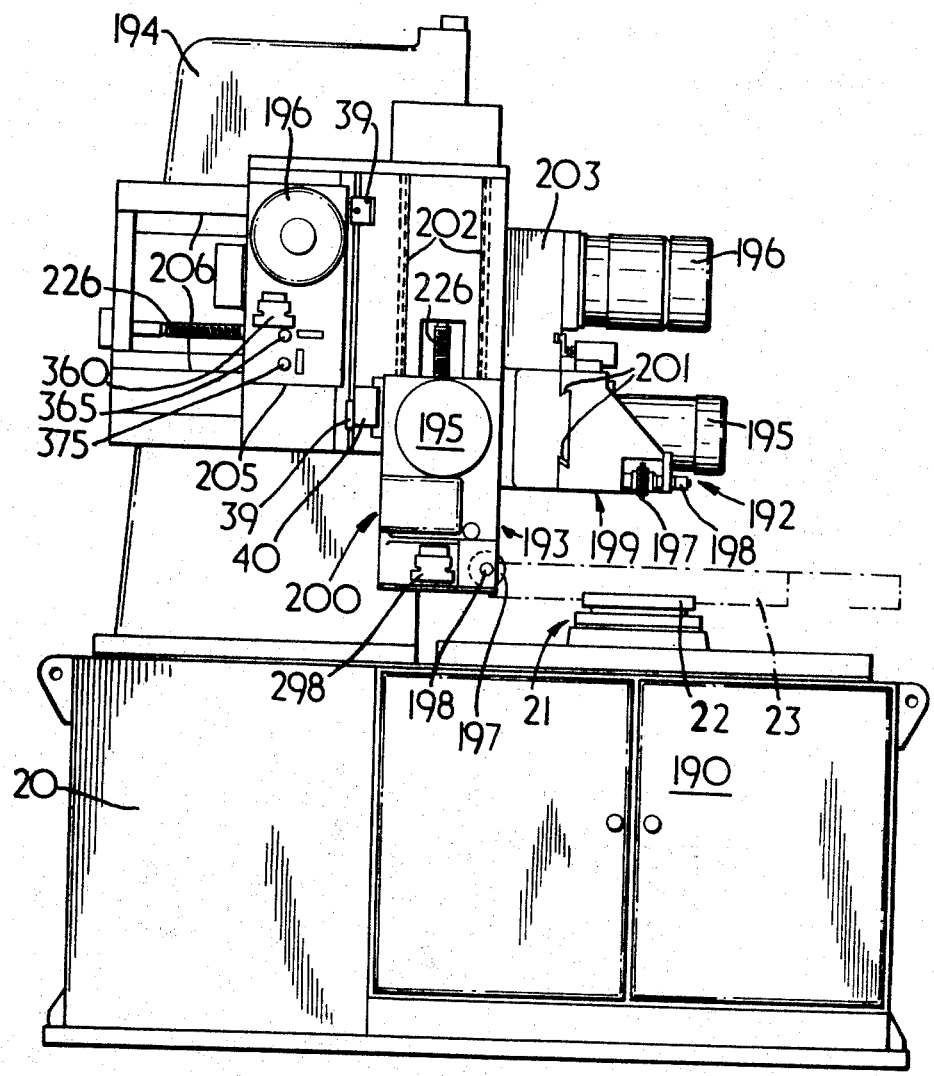
FIG. 3 is a side elevation in the direction of arrow 3 in FIG. 1.

Referring firstly to FIGS. 1 to 3 a machine is shown which has a fabricated base 20 on which is mounted a rotary spindle 21, and a face plate or work table 22 is removably attached to the spindle 21. The face plate 22 is replaceable to allow for different sizes of workpieces 23 to be secured to the face plate. The face plate 22 is rotatable with the spindle by drive means (see FIGS. 4–12) located within the base 20 below the face plate 22.

A control console 190 which houses an electrical control system for the machine is located at one side of the base 20 and the base also includes a tank 191 for lubricant for the machine.

Horizontal and vertical cutter assemblies 192 and 193 respectively are mounted on a common vertical turret or support frame 194 which is rigidly secured to the base 20 so that the whole of the basic structure of the machine is rigid and able to withstand cutting forces without significant distortion.

The horizontal and vertical cutter assemblies are very similar to one another in construction except that the horizontal cutter assembly 192 is turned through 90° with respect to the vertical cutter assembly 193. One only of the cutter assemblies will be described later in detail and, except where stated to the contrary, the two cutter assemblies are identical.

Each cutter assembly has two electric motors 195 and 196, and one motor 195 is for driving a cutter wheel 197 which is carried by a cutter spindle 198. The other motor 196 is for feeding the cutter wheel 197 in a reciprocal movement as it acts on the workpiece.

The cutter assemblies 192 and 193 include cutter heads 199 and 200 respectively on which the motors 195 are mounted and which contain transmission gearing in driving engagement with the respective motors 195. The horizontal cutter head 199 is movable horizontally along slides 201 and the vertical cutter head 200 is movable vertically along further slides 202.

The horizontal cutter head 199 is carried on a vertically movable cutter body 203 which is movable with respect to the turret 194 along slides 204. The vertical cutter head 200 is carried on a similar cutter body 205 which is movable horizontally along slides 206.

The vertical cutter head 200 effects a cutting action during downward movement of the head and, after a slot of the required length has been formed in the workpiece, the head is returned to its initial position above the workpiece. The return movement of the cutter head 200 is quicker than the cutting movement in order to save operating time. Thus for one cutting operation the cutter head 200 has extreme lower and upper positions and automatic control of the motion of the cutter head vertically is obtained by switches 39 mounted on the cutter body 205. The switches 39 each have a lever contactable by a cam 40 carried on the cutter head. When the cutter head 300 is in its lowermost position the cam 40 contacts a lever and the lower switch 39 is operated to cause the cutter head to stop downward movement of the head and initiate upward movement of the head. When the head 200 reaches the upper most position the cam 40 contacts the lever on the upper switch 39 and stops upward movement of the head. During the upward non-cutting movements the cutter wheel 197 continues to rotate and passes along the slot already formed in the workpiece. The vertical positions of the switches 39 may be varied to vary the stroke of the head.

The horizontal cutter head 199 has similar switches 39 and a cam 40 for controlling the movement of the head relative to the cutter body 203 during cutting action of its cutter wheel 197.

The cutter heads and drive means are more fully described with reference to FIGS. 13 – 20.

Figure 4:
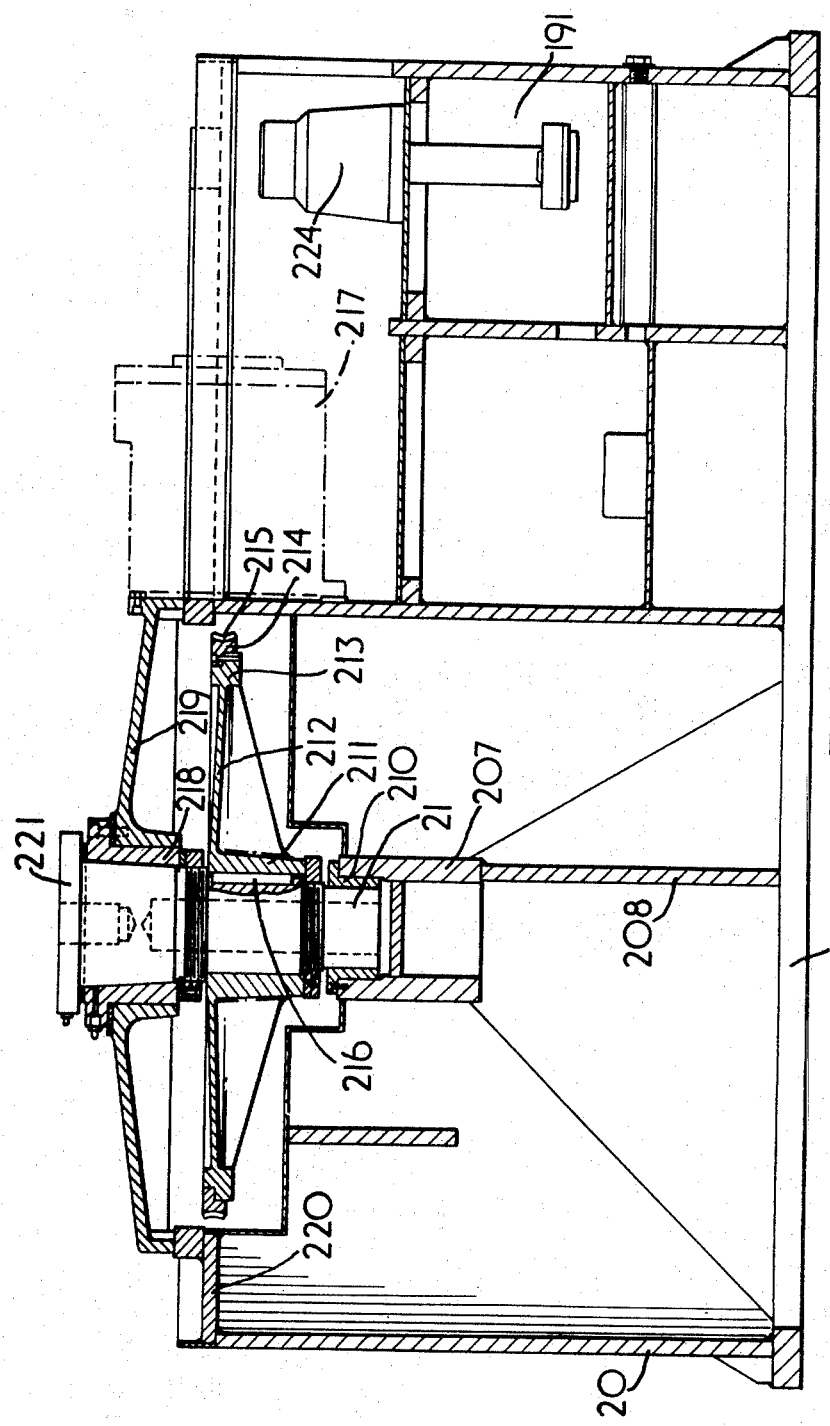
FIG. 4 is a section through the machine base and work table.

Referring now to FIG. 4 the base 20 supports a tubular member 207 on ribs 208 upstanding from a base plate 209. The member 207 carries a bearing 210 for the lower end of the spindle 21.

Figure 5:
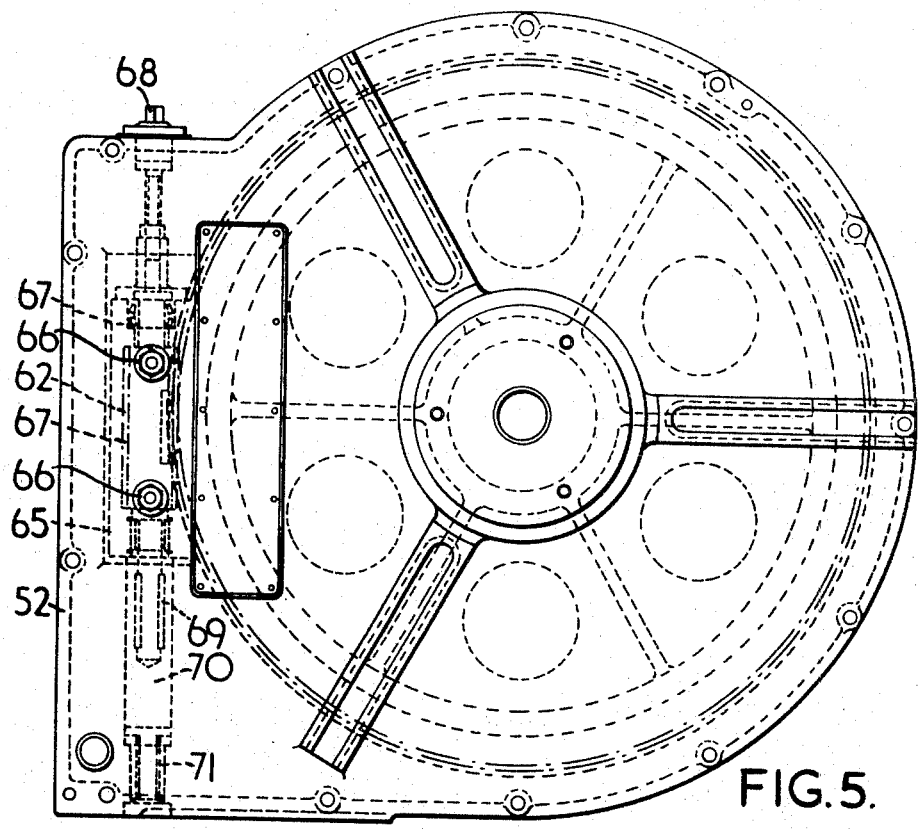
FIG. 5 is a plan view of the machine work table.
Figure 10:
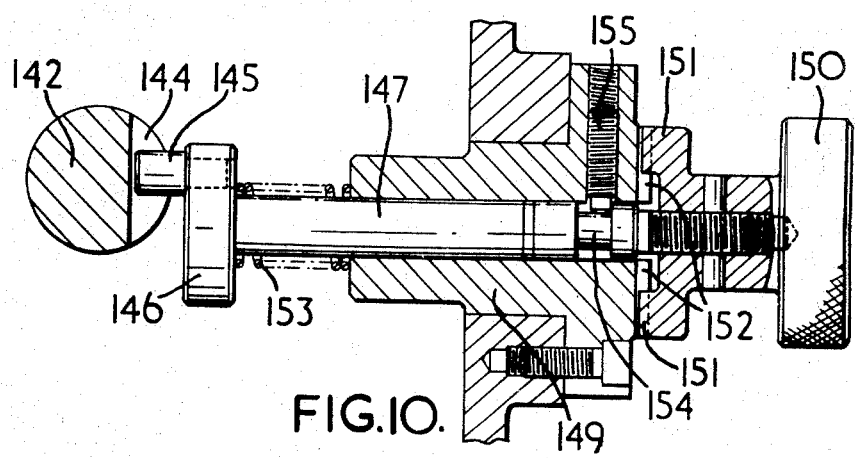
FIG. 10 is a part section on the line 10—10 in FIG. 9.
Figure 8:
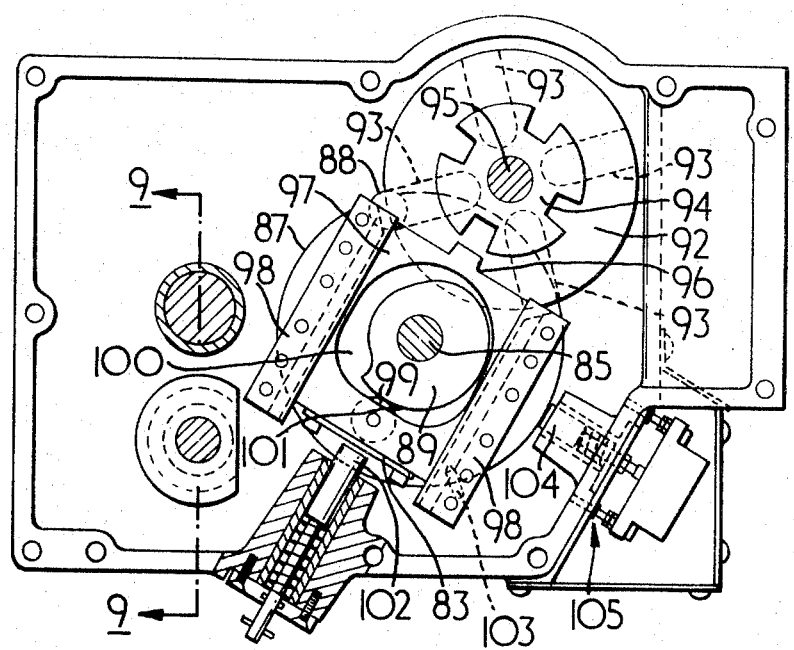
FIG. 8 is a sectional end elevation of the drive means of FIG. 6.

The spindle 21 has a sleeve 211 with a radially extending disc 212 having an integral annulus 213 on which a worm wheel 214 having teeth 215 is secured. the sleeve 211 is keyed to the spindle 21 by a key 216 and the spindle is driven through the worm wheel 214 and a driven worm (FIG. 5). Towards its upper end the spindle 21 passes through a sleeve 218 which is secured to a cover 219 and the core is secured to a top plate 220 of the base 20. The spindle 21 is formed at its upper end with a disc 221 to which the face palte 22 is secured.

A drive motor 217 (FIG. 2) for the spindle 21 is provided and a drive means and transmission for driving the spindle is of the form which enables the spindle to be rotated in accurately predetermined variable increments and also enables the spindle to be rotated continuously. Provision is made for the spindle to be uncoupled from the drive motor and rotated continuously by hand. The drive means and transmission for the spindle 21 are described with reference to FIGS. 5 – 12.

In the present construction the drive to the spindle is located in the base, and the spindle 21 and associated worm wheel 214 are readily removable from its support.

In FIG. 4 can be seen the tank 191 and a pump 224 for circulating lubricating oil to the machine.

Reference is now made to FIG. 5 in which a tapered worm shaft 62 is located in a portion 52 of the base and has a helically-arranged toothed portion which engages the teeth 215 on the wheel 214. The worm shaft 62 is carried in bearing blocks 65 secured to the base portion 52 by bolts 66. The bearing blocks 65 locate needle bearings 67 and a taper bearing in which the shaft 62 rotates and one end of the shaft 62 extends beyond the side of the housing 52 and is formed of square-section as at 68 for engagement by a spanner (not shown) by which the worm shaft can be adjusted axially to eliminate backlash.

The opposite end of the shaft 62 makes a splined connection 69 with a coaxial shaft 70 and the shaft 70 extends to adjacent the periphery of the housing 52 and is splined at 71 to receive a similarly splined input shaft 132 (see FIG. 6).

We refer now particularly to FIGS. 6-12 which show drive means including an indexing mechanism for driving the worm shaft 62 (FIG. 4) in predetermined increments and means for driving the shaft 62 in a continuous rotational movement. The electric motor 217 provides the drive for both these movements and has an output shaft 76 which is keyed to a shaft 77 carrying a gear wheel 78.

The shaft 77 extends beyond the gear wheel 78 to an electrically-operated clutch 79 which includes a member 80 rotatable with the shaft 77 and housing the coils of an electro-magnet. The clutch 79 also includes a driven member 81 adjacent the member 80 and attracted towards and into driving engagement with the member 80 when the electromagnet is operative. Thus when the clutch 79 is engaged a shaft 82 drivingly secured to the driven member 81 is rotated.

The shaft 82 carries helical worm teeth (not shown) arranged to engage a worm wheel 84 keyed to a shaft 85 (shown more clearly in FIG. 7). The shaft 82 extends beyond the teeth and has at its end remote from the motor 75 an electrically-operated brake assembly 86.

The shaft 85 carries a disc plate 87 keyed to and coaxial with the shaft 85 and a roller pin 88 (see FIG. 8) is attached to the disc 87. The shaft 85 also carries a cam plate 89 keyed to the shaft and the shaft 85 is located in end bearings 90 and 91. The disc 87 and the cam plate 89 each form part of a geneva mechanism shown more clearly in FIG. 8.

The geneva mechanism also includes a disc 92 having four equally-spaced radial slots 93 arranged to receive the pin 88, and the disc 92 is rotated by the pin 88 on rotation of the disc plate 87 and engagement of the pin 88 in one of the slots 93. A further disc 94 is coaxial with the disc 92 and is mounted for rotation with the disc 92 about a common shaft 95. The disc 94 is axially spaced from the disc 92 and is of smaller diameter than the disc 92 and has four radial slots arranged intermediate the slots 93 in the disc 92 and for receiving a projection 96 on a locking plate 97.

The locking plate 97 is mounted for reciprocal sliding movement in guides 98 and carries a wear plate 83 at the opposite end to the projection 96, and a roller 99 secured to the plate 97 so as to project beyond the plate 97 into the space 100 in the plate 97 in which the cam plate 89 is located. The cam plate 89 has a cam periphery 101 which engages the roller 99 and a spring-loaded rod 102 engages the wear plate 83 and urges the locking plate 97 towards the disc 94 in opposition to the action of the cam 89 on the roller 99.

The disc 87 carries a trip 103 which rotates with the disc 87 and contacts a spring-loaded plunger 104 of a switch device 105, depression of the plunger 104 by the trip device causing a signal to be transmitted to the electrical control system (not shown) of the machine to disengage the clutch 79 and apply the brake 86.

The shaft 95 is driven in increments by the geneva mechanism and extends through the housing to be coupled to a shaft 106 by a clamping arrangement (FIG. 6) including an annular disc 107 and a bracket 108 held together by bolts 109 and clamping a disc-like enlargement at the end of the shaft 106. On release of the bolt 109 the clamping arrangement is released and the shafts 95 and 106 are rotatable independently. The face plate 22 can be rotated by hand with the bolt 109 released by revolving a gear wheel 116.

Figures 11, 12:
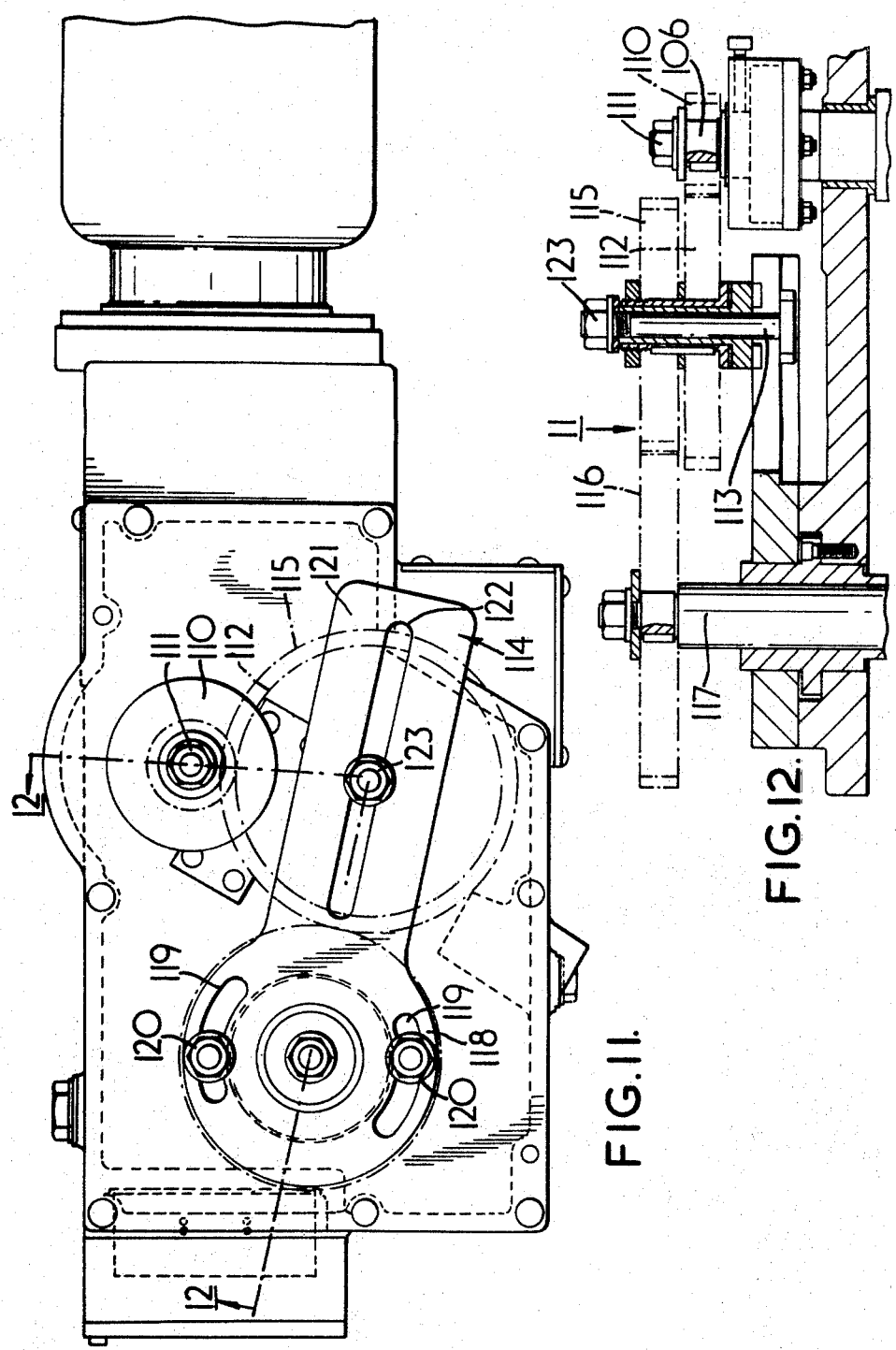
FIG. 11 is an end elevation in the direction of arrow 11 in FIG. 12.
FIG. 12 is a sectional elevation on the line 12—12 in FIG. 10.

The indexing drive to the work table is transmitted from the shaft 106 through gearing shown more clearly in FIGS. 11 and 12. The gearing includes a gear wheel 110 mounted for rotation with the shaft 106 and secured to the shaft 106 by a nut 111. The gear wheel 110 engages a gear wheel 112 carried on an intermediate gear shaft 113 carried on a support bracket 114. A further gear wheel 115 is also carried on the shaft 113 for rotation with the wheel 112, and the gear wheel 115 engages with a final gear wheel 116 in the gear train. The gear wheel 116 is secured for rotation with a drive shaft 117 which extends through the housing for driving engagement with the shaft 70 (FIG. 5).

The bracket 114 is arranged to accommodate any combination of gear wheels 110, 112, 115 and 116 so that the gear ratio of the gearing from the geneva mechanism may be varied according to magnitude of the desired indexing movement of the work table. Thus the bracket 114 is formed with a disc-like portion 118 having two opposed part-annular slots 119 in each of which are located a nut and bolt 120. The bracket 114 also has an integral arm portion 121 with a longitudinal slot 122 through which the shaft 113 is located and secured by a nut 123. The bracket 114 may be rotated about the shaft 117 on release of the nuts 120, and the intermediate shaft 113 may be located in any position along the slot 122 so as to assume any desired position in relation to the shafts 106 and 117 in accordance with the arrangement of gearing. The gear wheels may be readily replaced by release of the securing nuts 120, 111 and 123.

Figure 9:
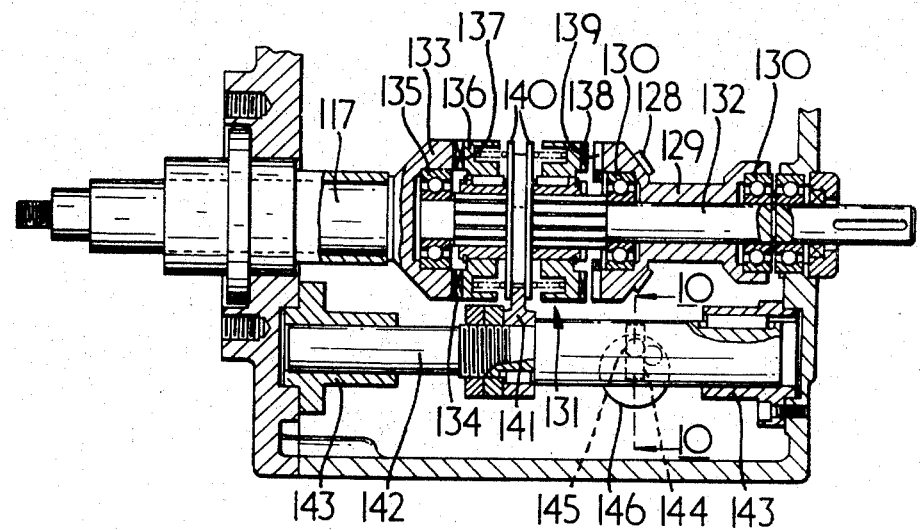
FIG. 9 is a part section on the line 9—9 in FIG. 8.

During certain phases of the operation of the machine it is required to rotate the work table continuously, for example, when centering the work piece on the table. Drive for continuous rotation is also taken through the gear wheel 78 (FIG. 6) from the motor 217. An intermediate gear wheel (not shown) engages the gear wheel 78 and also a gear wheel 124 carried on a shaft 125 so that the drive is transmitted from the motor to the shaft 125 as long as the motor 217 is rotating. The shaft 125 is located in bearings 126 and extends through the housing to drivingly engage a gear wheel 127 of bevel gearing 128. The gear wheel 127 engages gear teeth on a sleeve 129 rotatable about and coaxial with a shaft 132 on bearings 130. As shown in FIG. 9 the sleeve 129 is in a disengaged position from a dog clutch arrangement 131 and the machine is therefore arranged for indexing of the work table through the geneva mechanism.

The clutch arrangement 131 is provided for selecting whether the work table is to be operated at indexing rates or for continuous rotation. The shaft 117 is formed with an annular extension 133 having an annular row of teeth 134, and locating axially the end of the shaft 132 in a bearing 135. An axially movable clutch member 136 engages a splined portion of the shaft 132 for rotation with the shaft 132. At the ends of teh member 136 are annular rows of teeth 137 and 138 for engagement selectively with the row of teeth 134 on the extension 133 and a row of teeth 139 on the sleeve 129 respectively. The central portion of the member 136 is formed with two parallel spaced-apart annular plates 140 between which is located a pin 141.

As shown in FIG. 9 the clutch member 136 has been moved towards the left so that the teeth 137 engage with the teeth 134 and drive from the indexing mechanism is transmitted from the shaft 117 through the clutch to the shaft 132. The shaft 132 is keyed to the shaft 70 to thereby drive the worm shaft and worm wheel for the work table.

The pin 141 is secured to an axially movable shaft 142 slidably located in housings 143 at each end of the shaft 142. The shaft 142 is formed with a transverse slot 144 engaged by a pin 145. The pin 145 is carried on a disc 146 formed on the end of a shaft 147 of a clutch operating mechanism 148 shown in FIG. 10. The shaft 147 is movable axially and is rotatable in a housing 149, and the shaft 147 is secured to a manually operable handle 150 having dogs 151 engageable in two pairs of slots 152 (only one of which is shown). A spring 153 is located between the disc 146 and the housing 149 urges the shaft 147 towards the shaft 142. A groove 154 is formed in the shaft 147 and is engaged by a pin 155 to restrict axial movement of the shaft 147.

The shaft 147 may be rotated on drawing the shaft 147 outwardly so that the dogs 151 are disengaged from one pair of slots 152, and rotation of the shaft 147 enables the dogs 151 to be engaged in the other pair of slots 152. On rotation of the shaft 147 the pin 145 engages the side of the transverse slot 144 in the shaft 142 and moves the shaft 142 axially. This movement causes the pin 141 to move the clutch member 136. Thus the clutch member 136 may be moved out of the position shown in FIG. 9 into a position in which the teeth 137 are disengaged from the teeth 134 and, instead, the teeth 138 are engaged with the teeth 139 on the sleeve 129. In the latter position the motor is driving the shaft 132 through the bevel gearing 128 and the work table is being continuously rotated.

During a slot cutting operation the cutter wheel may break or for other reasons it may be necessary for the machine operator to inspect the slot just formed. This is achieved by changing the work table drive from an indexing movement to a continuous rotation and rotating the table until the operator can view the slot. To continue the slot cutting operation the work table has to be rotated until the table is in the correct position for continuing to cut the partially cut slot or the next adjacent slot. The table is rotated by the continuous rotation arrangement until the table approaches the required position. An indexing movement of the table is then initiated but it will be appreciated that correct positioning of the table with the slots registering with the cutter wheel is unlikely to be achieved in this way without any further adjustment of the position of the table.

Provision is therefore made for the table to be turned manually independently of the indexing mechanism.

This is achieved by releasing the bolts 109 (FIG. 6) and releasing the clamping arrangement on the shafts 95 and 106. The shaft 132 can then be rotated by a tool applied to the shaft 117 and although the gearing between the shafts 106 and 117 will rotate the geneva mechanism will remain stationary.

Figure 13:
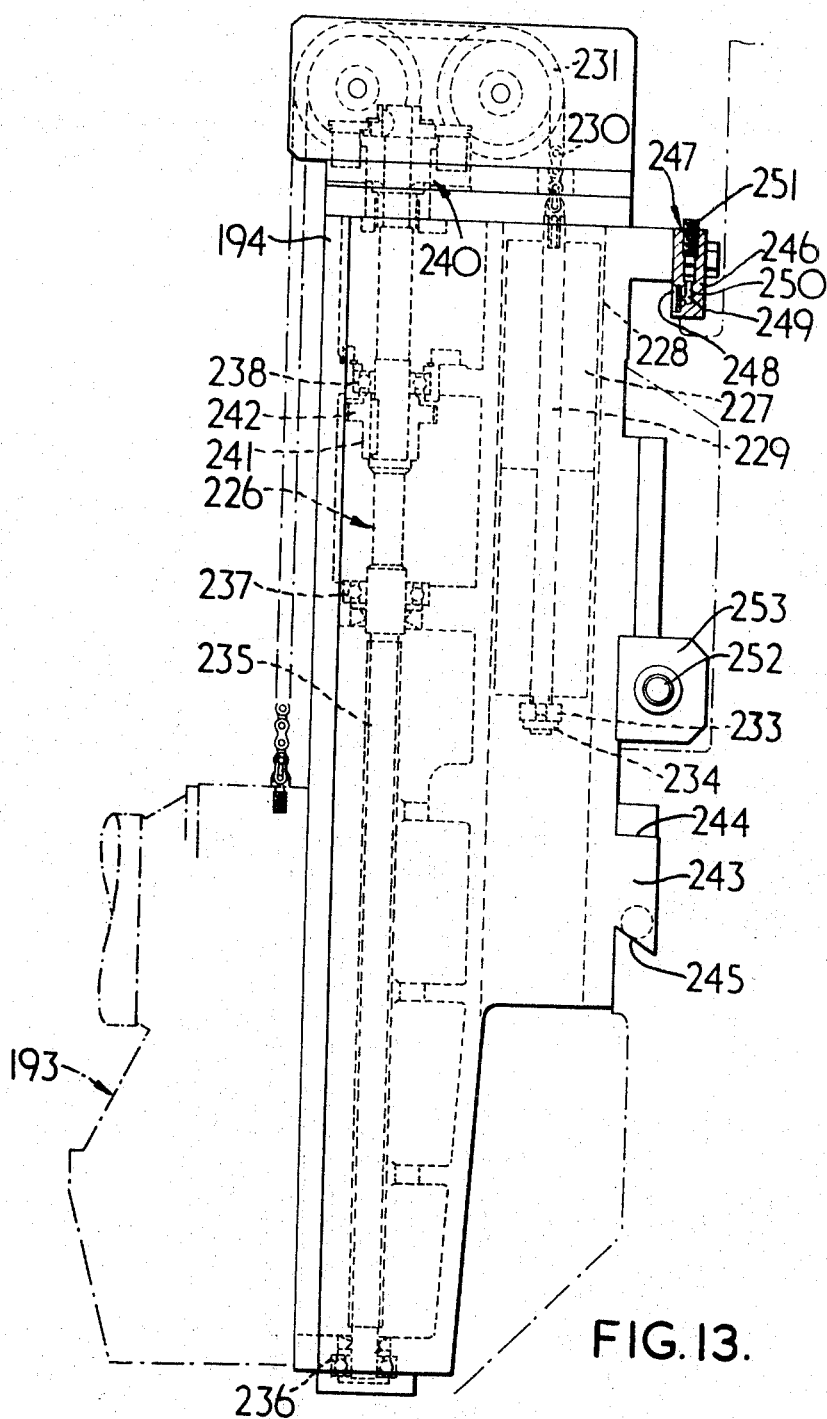
FIG. 13 is a side elevation of the machine turret.

Referring now to FIG. 13 which shows the machine turret 194 and a balance weight arrangement for the vertical cutter assembly 193 and a rotatable shaft 226 by which the vertical cutter head is driven reciprocally vertically.

The balance weight arrangement includes a balance weight 227 which is movable vertically in a rectangular chamber 228 formed in the turret 194. The balance weight 227 is supported on two guide bars 229 which extend through bores formed in the weight, and the upper ends of the guide bars 229 are connected to Reynolds' chains 230 which pass over two pairs of pulleys 231 and 232 mounted on the turret. The opposite ends of the chains 230 are connected to the upper part of the cutter assembly 193.

The weight 227 is supported on the guide bars 229 by collars 233 supported on pins 234 and the tension in each chain 230 can be adjusted so that the tension in the chains is the same.

The shaft 226 is formed with a screw-threaded portion 235 and a screw-threaded member carried on the cutter assembly 193 is located around the portion 235. The shaft 226 extends vertically through the turret 194 and is supported at its lower end in bearings 236, intermediate its ends in bearings 237, and towards its upper end in bearings 238. An electrically-operated magnetic brake 240 is located at the upper end of the shaft 226 to arrest the shaft when drive to the shaft is discontinued. The shaft 226 is keyed to a sleeve 241 which is formed with a gear wheel 242 by which the shaft is rotated.

FIG. 13 also shows in more detail the slideway 204 for the horizontal cutter assembly 193. The slideway 204 includes a key 243 which engages in a corresponding keyway formed in the cutter body 203, the key 243 having an upper horizontal bearing surface 244 and a lower inclined keying surface 245. The body 203 is held at the upper end by a further part of the slideway 204 formed by a plate 246 bolted to the turret and housing a thrust unit 247 for locking the body 203 in the desired positions. The thrust unit 247 includes a friction member 248 which is acted on by wax 249 contained in a bore 250 and put under pressure by operating a screw 251.

A shaft 252, which corresponds to the shaft 226, engages in a screw-threaded member 253 carried on the horizontal cutter assembly 192 and the shaft 252 is rotated to move the assembly horizontally.

Figure 14:
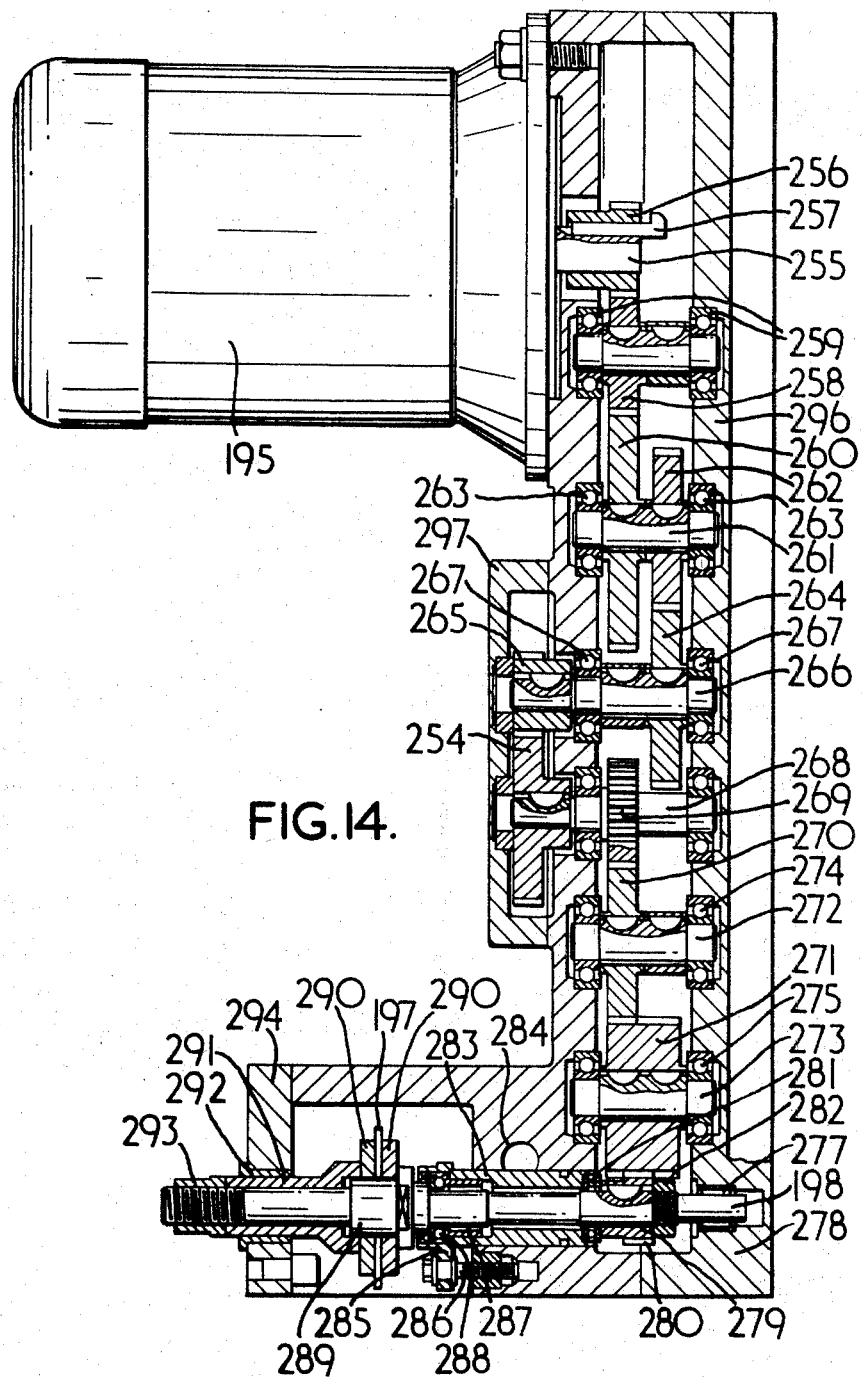
FIG. 14 is a cross section on the line 14—14 in FIG. 15.
Figure 15:
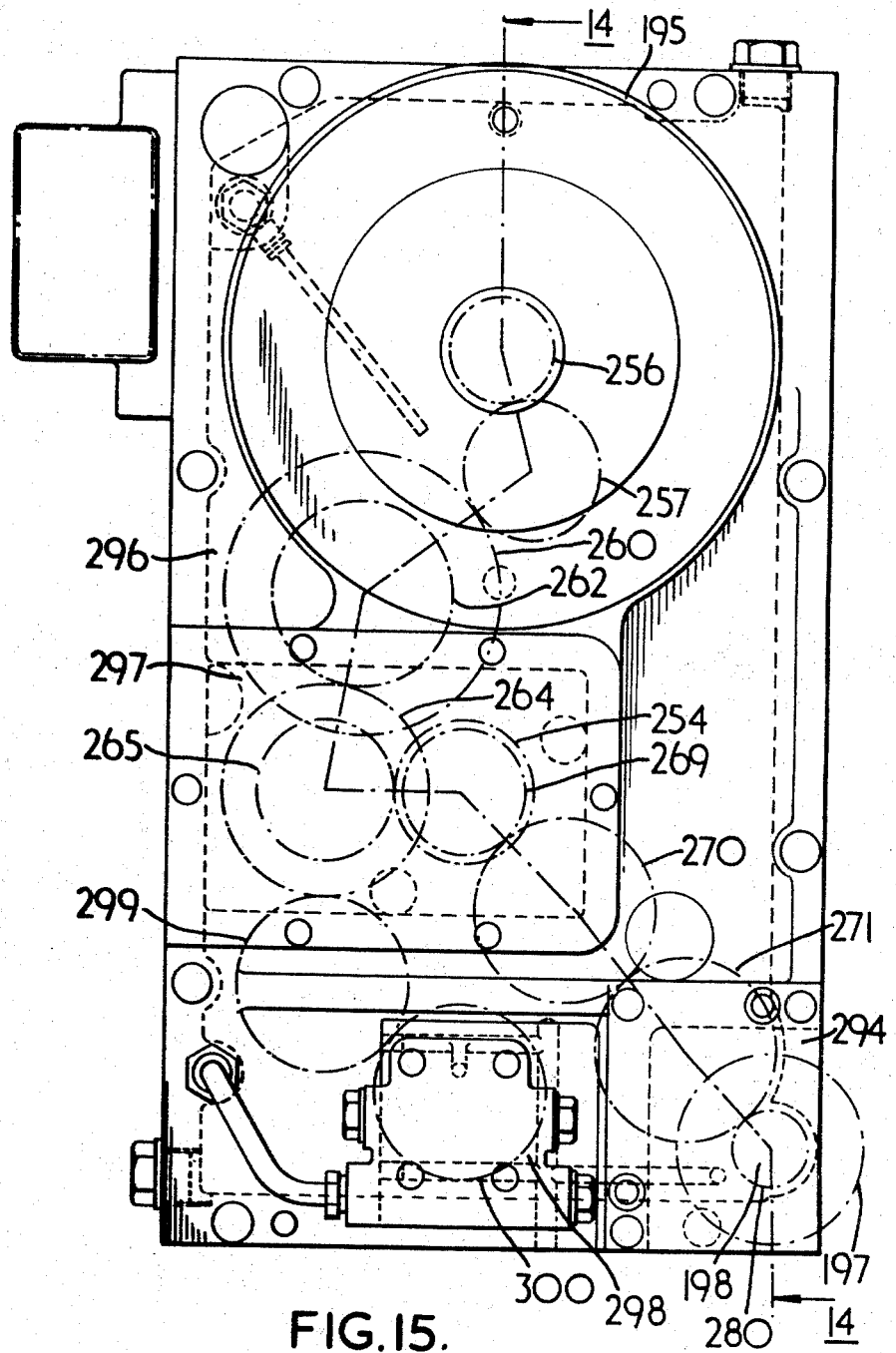
FIG. 15 is a front elevation of a cutter head.

Referring to FIGS. 14 and 15 which show the drive transmission between the drive motor 195 and the cutter wheel 197 and the cutter spindle 198, the drive motor 195 is driven at a constant speed to drive the spindle 198 at a predetermined constant rotational speed.

The motor 195 has an output shaft 255 to which is keyed a gear wheel 256 by a key 257. The gear wheel 256 is the first in a train of reduction gears and transmits drive to a gear wheel 257 which includes a shaft 258 supported in bearings 259. The gear wheel 257 engages a further gear wheel 260 carried on a shaft 261 which also carries a gear wheel 262. The shaft 261 is mounted in bearings 263 and the gear wheel 262 engages a gear wheel 264 which, with a gear wheel 265, is carried on a common shaft 266. The shaft 266 is mounted in bearings 267 and the gear wheel 265 is removable from the shaft 266.

The gear wheel 265 engages a further removable gear wheel 254 which is keyed to a shaft 268 which carries a gear wheel 269. The gear wheel 269 transmits drive successively through gear wheels 270 and 271 to the spindle 198 and the gear wheels 270 and 271 are carried on respective shafts 272 and 273 which are mounted in bearings 274 and 275 respectively.

The removable gear wheels 265 and 267 enable the rotational speed of the spindle 198 to be varied according to the desired speed of the cutter wheel 197 by replacement of the gear wheels 265 and 267 by gear wheels having different ratios.

The spindle 198 has one end located in a needle bearing 277 which is located in a spingle housing 278. A sleeve 279 formed with gear teeth 280 is keyed to the spindle 198 and the teeth 280 engages the last gear wheel 271 in the train of gears. The sleeve 279 bears against a thrust bearing 281 at one end and against a collar 282 at the other end. The thrust bearing 281 is located against a sleeve 283 surrounding the spindle and held in place by a bolt (not shown) located in a bore 284. The sleeve 283 is formed with a radial arm 285 through which is located an adjusting screw 286 which engages the housing 278 and enables the spindle to be movable axially a small distance each side of a central position. This feature allows for opening out slots previously cut by the cutting wheel, using a cutter wheel of greater thickness.

A needle bearing 287 and a thrust bearing 288 are located between the spindle and the sleeve 283. The cutting wheel 197 is located about a wider portion 289 of the spindle between two collars 290. The collars 290 are urged into engagement with the wheel by a sleeve 291 located about the spindle and in a bush 292. The sleeve 291 is held in place by a locking nut 293. The bush 292 is located through a bore formed in a plate 294 forming part of the housing 278.

The arrangement allows for replacement of the spindle by an alternative spindle should it be required to use a different size of cutter wheel.

The rotational speed of the cutter wheel may be varied from 200 to 1,100 r.p.m. If the electric motor 195 can be matched to the desired speed of the cutter wheel or if a D.C. motor were employed, it would be possible to dispense with at least some of the fixed gear wheels and the replaceable gear wheels in the transmission from the motor 195.

The drive arrangement from the motor 195 to the cutter wheel is identical for both the vertical and the horizontal cutter assemblies, the rotational speed of both wheels being variable.

The gear train from the motor 195 to the spindle 198 is located in a gear casing 296 and the casing includes a removable cover 297 by which access may be obtained to the removable gear wheels 265 and 267.

A lubrication pump 298 (FIG. 15) is also driven from the motor 195 by a gear train comprising gear wheels 299 and 300 driven from the gear wheel 264 and housed in an extension of the casing 296.

Referring now to FIGS. 16-20 a transmission for feeding the cutter head during cutting and for returning the cutter head to its initial cutting position after a cutting operation, is shown. FIGS. 16-20 also show manually operable drive means for positioning the cutter head and cutter body prior to commencing a cutting sequence.

The motor 196 is arranged to feed and return the cutter head during a cutting operation and the motor 193 is provided to drive the associated cutter wheel 197 only.

The motor 196 has an output shaft 305 (FIG. 16) to which is keyed a gear wheel 306 by means of a taper key 307. The gear wheel 306 drives a compound gear wheel 308 keyed to a shaft 309 which is carried in bearings 310 and 311 in a casing 312. A mitre gear wheel 313 is keyed to the shaft 309 and engages a corresponding mitre gear wheel 314 (FIG. 17) which is keyed to a shaft 315 carried in four bearings 316 spaced along the length of the shaft 315.

An electrically-operated magnetic clutch 317 is located at one end of the shaft 315 and the clutch includes an inner member 318 in driving engagement with the shaft 315. On operation of the clutch 317 drive is transmitted from the member 318 to an outer member 319. The member 319 carries an axially extending pin 320 which is located in a bore formed in an annular flange 321 integral with a sleeve 322 which is located about the shaft 315 and is rotatable relative therto. Operation of the clutch 317 causes drive to be transmitted to the sleeve 322, and a gear wheel 323 formed on the sleeve 322 at the opposite end to the flange 321 is also thereby rotated.

The gear wheel 323 engages a further gear wheel 324 keyed to a shaft 325 which is mounted in bearings 326 and 327 and which also carries a mitre gear wheel 328 keyed to it.

The gear wheel 324 engages a gear wheel 329 formed on a sleeve 353 rotatable about and relative to a further shaft 330, and the gear wheel 329 transmits drive to a gear train having gear wheels 331, 332 and 242. The final gear wheel 242 of the gear train is keyed to the shaft 226, rotation of which causes the associated cutter head to be moved vertically or horizontally, whichever the case may be.

The mitre gear wheel 314 engages a further mitre gear wheel 335 carried on a shaft 336 which is mounted in bearings 337 and 338. At the opposite end of the shaft 336 to the mitre gear wheel 335 is keyed a gear wheel 339 and the gear wheel 339 drives a shaft 340 (FIG. 24) offset from and parallel to the shaft 336. The shaft 340 is keyed to an extension shaft 341 which is carried in bearings 342 and 343 and which is formed with a worm 344 engaged by a worm wheel 345 (FIG. 17) keyed to the shaft 330.

The shaft 330 is carried in bearings 346 and 347 and at one end of the shaft 330 is located a further electrically-operated magnetic clutch 348 having an inner member 349 keyed to the shaft 330, and an outer member 350 rotatable on operation of the clutch 348.

Only one of the clutches 317 and 348 is operable at any onetime and on operation of one clutch the other clutch is automatically de-energised by means of the electrical control system of the machine.

The outer member 350 has an axially-extending pin 351 which is located in a bore formed in an annular flange 352 integral with the sleeve 353 and, on rotation of the sleeve 353, the shaft 226 is rotated through the same train of gear 329, 331, 332 and 242 as described previously, only this time the shaft 226 rotates in the opposite direction.

The clutch 317 is operated to drive the cutter head at a faster speed than when the clutch 348 is operated, the clutch 348 being operated for feeding the cutter wheel during cutting operations and the clutch 317 being operated for returning the cutter wheel to its initial cutting position.

The operation of the clutches 317 and 348 is controlled according to the position of the cutting head in relation to the switches 39, and according to the indexing movement of the work table, and also according to the stage of operation of the horizontal cutter, by electrical control means (not shown). The operation of the machine is controlled automatically by the control means in a predetermined cycle or sequence and in accordance with the presetting of the various controls, for example, the extent of vertical movement of the cutter head, the magnitude of each indexing movement and the speed of cutting.

A gear wheel 355 (FIG. 16) of the compound gear wheel 308 engages with a gear wheel 356 formed on a shaft 357 carried on bearings 358 and 359 and the shaft 357 drives a pump 360 for lubricating oil. The oil from the pump 360 passes through a pipe to an oil duct 362 (FIG. 19) formed in the wall of the casing 312. Branch pipes 363 connect with the duct 362 to carry oil to the various gears, and the duct 362 is extended round the casing to carry oil to the worm shaft 344 and the worm wheel 345 through pipes 364.

Figure 16:
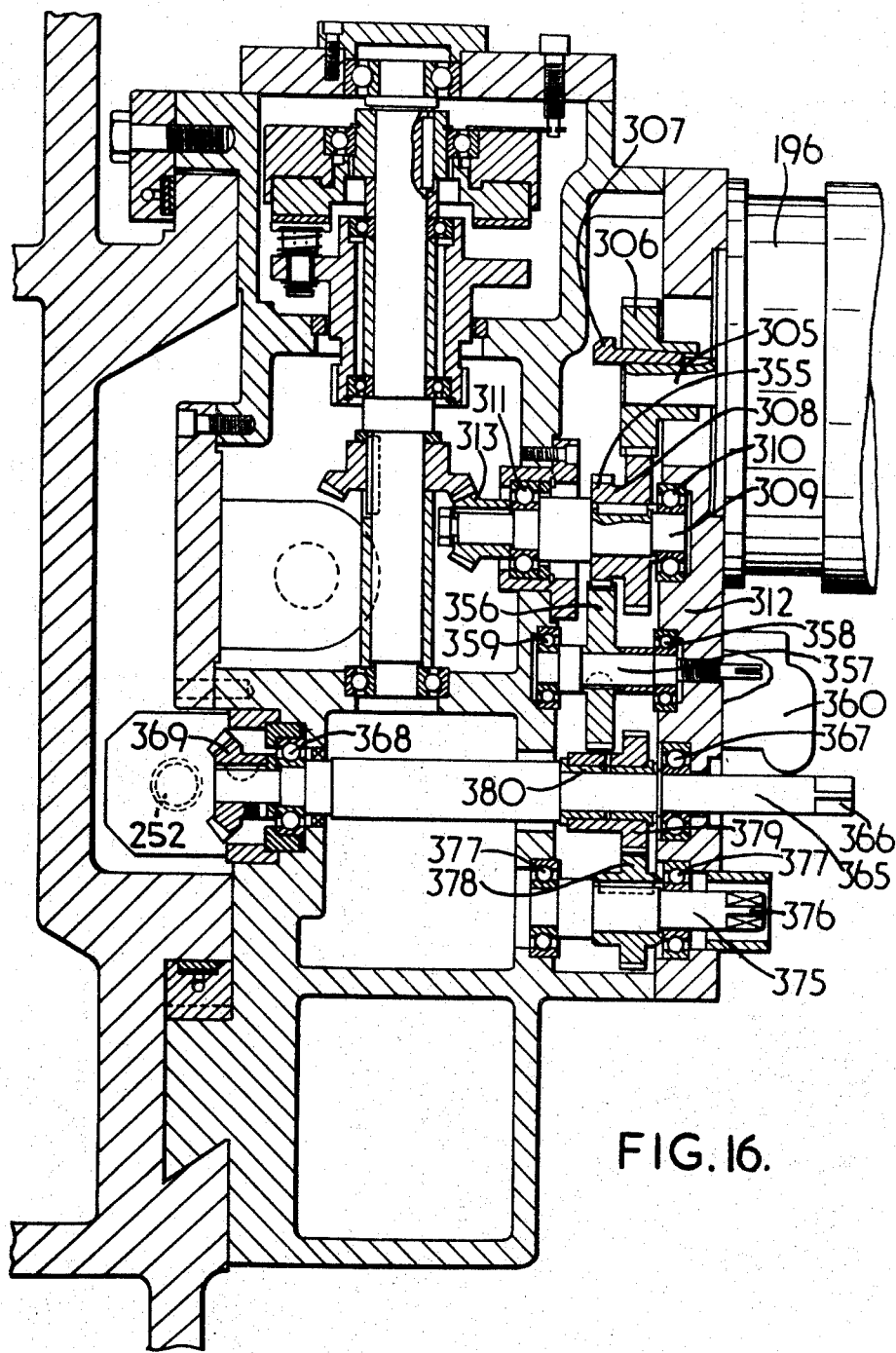
FIG. 16 is a cross section of the drive transmission to the cutter head.
Figure 17:
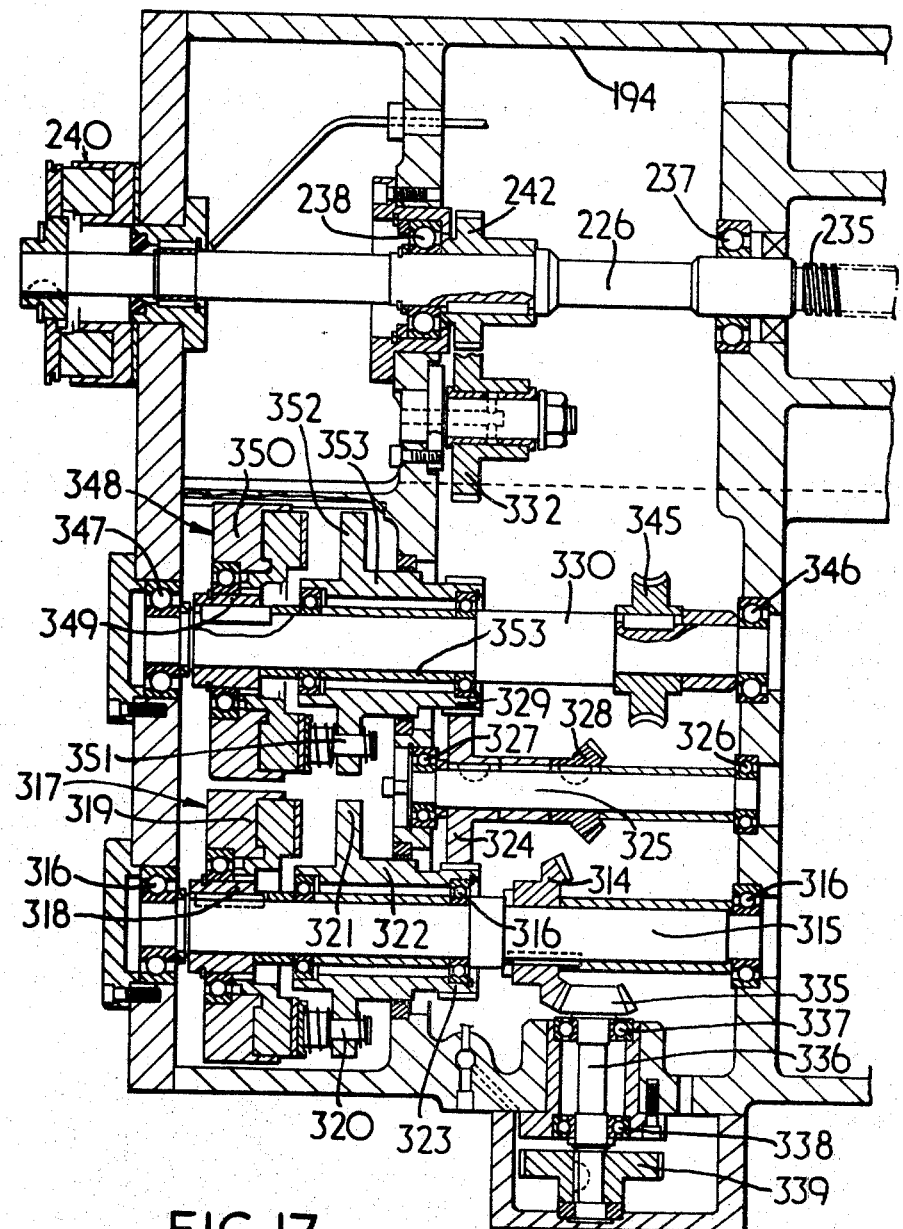
FIG. 17 is a cross section of the transmission of FIG. 16 in a plane at a right angle to the plane of FIG. 16.
Figure 18:
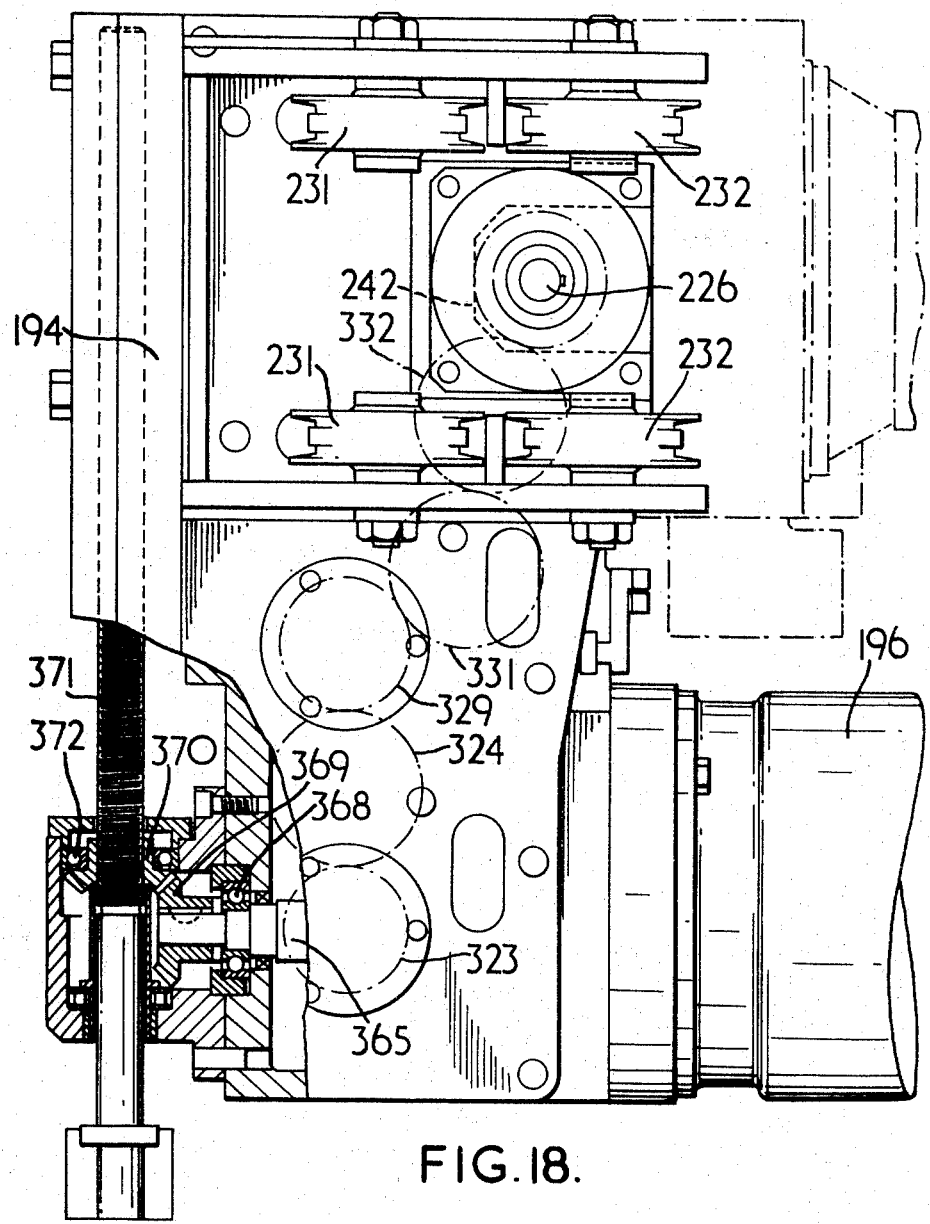
FIG. 18 is a side elevation partly cut away of the transmission of FIGS. 16 and 17.
Figure 19:
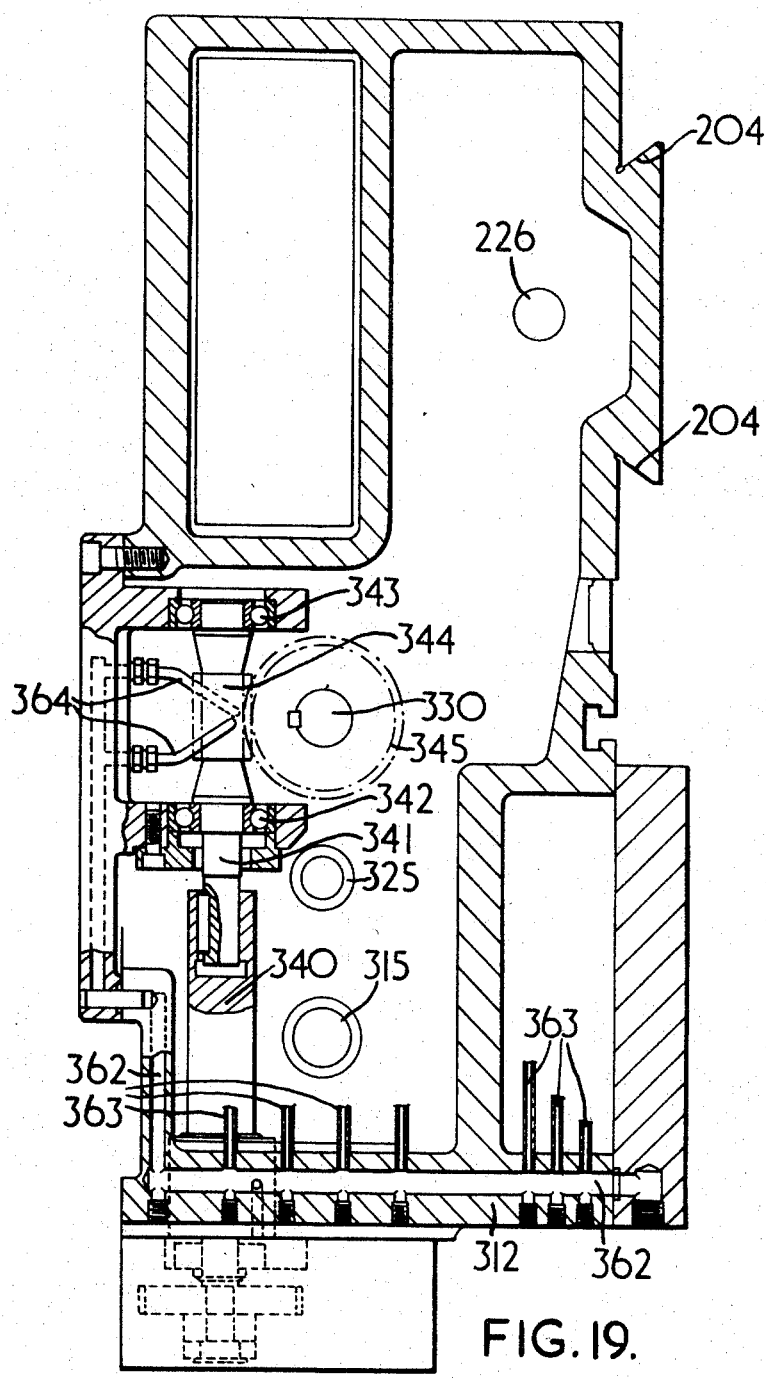
FIG. 19 is a cross section of part of the transmission of FIGS. 16–18.
Figure 20:
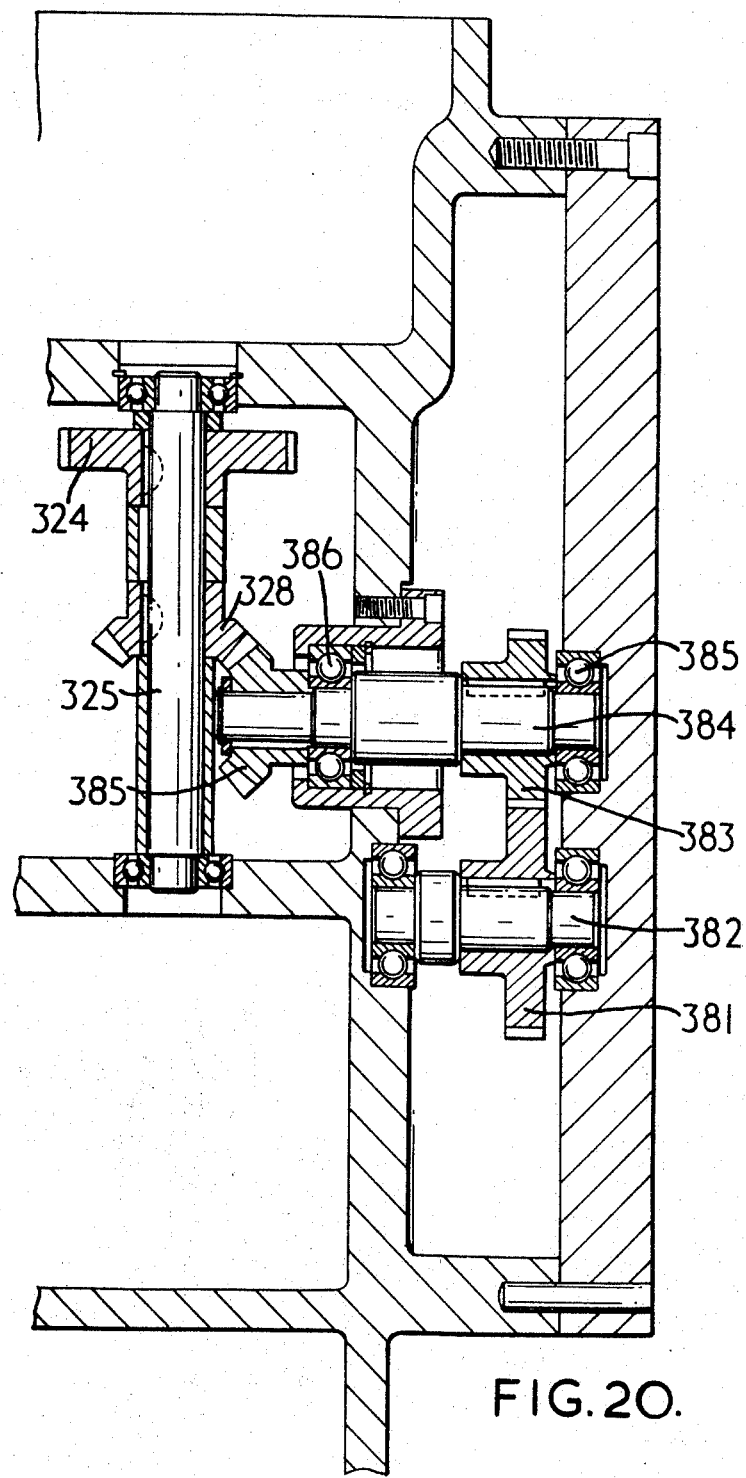
FIG. 20 is a section of part of the transmission of FIGS. 16–19.

FIGS. 16 – 20 also show the manually operable drives for the cutter body and for the cutter head, see particularly FIGS. 16 and 18. A shaft 365 extends beyond the casing 312 and is formed with a squared end 366 for receiving a handle (not shown). The shaft 365 extends through bearings 367 and 368 and carries, keyed to it at its opposite end, a mitre gear wheel 369 which engages with a corresponding mitre gear wheel 370 carried on a shaft 371.

The gear wheel 370 is in screw-threaded engagement with a screw thread formed on the shaft 371 so that as the wheel 370 is rotated the cutter body is caused to move horizontally in the case of the vertical cutter assembly and vertically in the case of the horizontal cutter assembly, relative to the shaft 371.

The gear wheel 370 is located in bearings 372 and the shaft 371 is located rigidly on the turret 194.

The location of the shaft 365 enables the cutter body to be moved to position the body, prior to a cutting sequence being started, by the operator who can rotate the shaft 365 and simultaneously observe the position of the cutter wheel.

A shaft 375 also extends beyond the casing 312 and is formed with a squared end 376 to which a handle (not shown) can be fitted to rotate the shaft 375 which is carried in bearings 377 and is keyed to a gear wheel 378. The gear wheel 378 meshes with a gear wheel 379 coaxial with and rotatably mounted on the shaft 365. The gear wheel 379 is mounted on a bush 380 so as to be rotatable relative to the shaft 365.

The gear wheel 379 engages with a further gear wheel 381 (FIG. 20) keyed to a shaft 382 and the gear wheel 381 engages with a gear wheel 383 keyed to a shaft 384 carried in bearings 385 and 386. The shaft 384 is formed with a mitre gear wheel 385 which in turn engages with the mitre gear wheel 328. Thus rotation of the shaft 375 causes rotation of the shaft 226 through the train of gears previously described, thereby enabling the position of the cutter wheel to be manually adjusted in the direction of its feed movement. It will be apparent that this adjustment is undertaken when the motor 196 is stationary. The position of the shaft 375 enables the adjustment to be made by the operator as he observes the cutter wheel position. After the adjustment is completed the position of the cutter body is locked by the unit 247.

Means (not shown) are provided for leading lubricating oil direct to the slideways 204 and 206 and to where the threaded portion 235 of the shaft 226 engages with the threaded member carried on the cutter body.

Thus the horizontal and vertical cutters are capable of simultaneously cutting radial and axial slots at variable spacings and of variable widths and depths in a cylindrical workpiece and the work table can be turned between each cutting operation through an accurately predetermined angular increment which can be varied to give 350 – 3,600 divisions per revolution of the work table. For machining, for example, workpieces for knitting machines the increments moved during the indexing movement must be very accurately maintained, and since any error is cumulative too large an error would render the finished workpiece useless. The error is reduced to an acceptable limit by utilising a worm shaft and worm wheel drive and geneva mechanism for the work table drive and by always rotating the work table in the same direction, thereby obviating any backlash effect in the drive which may be produced during reverse rotation. The work table is capable of being rotated continuously to centre the workpiece and to inspect the slots during the cutting operation. Moreover the indexing arrangement enables the slots to be opened out after the original slot forming action and intermediate slots to be subsequently formed as required.

The rotational speeds of the cutter wheels are variable according to the diameter of wheel being used, and the nature of the workpiece material and of the cutter wheel material.

We claim:

1. A machine tool comprising a rotatable work table for supporting a workpiece, two cutter heads on each of which a rotatable cutting tool for acting on the workpiece is arranged to be carried, a base frame on which the work table is supported, a support frame rigidly secured to and upstanding from the base frame and extending in a generally vertical direction above the level of the work table and the two cutter heads being mounted on the support frame, the support frame being supported by the base frame only its lower end, drive means carried on each cutter head for driving the associated cutting tool, and drive means for moving the cutter heads relative to the support frame, one of the cutter heads being arranged to move parallel to the axis of rotation of the work table and the other cutter head being arranged to move radially of the axis of rotation of the work table.

2. A machine tool according to claim 1 wherein the cutter heads are each carried on respective cutter bodies movably mounted on the common support frame, each cutter body being movable in a plane parallel to the plane of movement of the associated cutter head relative to the support frame but at a right angle to the direction of movement of the associated cutter head.

3. A machine tool according to claim 2 wherein each of the cutter heads has a guide co-operating with a guide way on the associated cutter body, and the drive means for moving the cutter heads relative to the support frame is arranged to move each guide along the associated guide way and includes a rotatable screw-threaded shaft which is in screw-threaded engagement with the cutter head.

4. A machine tool according to claim 1 wherein the drive means for moving each cutter head relative to the associated support frame is operable at at least two speeds, one speed being for movement of the cutter head during a cutting operation of the cutting tool and the other, relatively faster, speed being for returning the cutter head to its initial position with respect to the support frame.

5. A machine tool according to claim 3 wherein the drive means for moving the cutter heads are carried on the respective cutter bodies, and the drive means for rotating the cutting tools each include change speed means for varying the rotational speed of the cutting tool.

6. A machine tool according to claim 1 comprising drive means for the worktable including a drive motor, a geneva mechanism, and a worm and worm wheel, the geneva mechanism being selectively engageable with the drive motor and the worm and worm wheel to obtain variable increments of movement of the worktable, and the drive means also includes clutch means whereby the worktable is drivable in increments through the geneva mechanism or is drivable continuously, bypassing the geneva mechanism.

* * * * *